(12) United States Patent
Wan et al.

(10) Patent No.: US 8,879,484 B2
(45) Date of Patent: Nov. 4, 2014

(54) METHOD, APPARATUS, AND SYSTEM FOR PROCESSING REFERENCE SIGNAL

(75) Inventors: Lei Wan, Beijing (CN); Qiang Li, Beijing (CN); Yajun Zhao, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 13/340,337

(22) Filed: Dec. 29, 2011

(65) Prior Publication Data

US 2012/0099547 A1 Apr. 26, 2012

Related U.S. Application Data

(63) Continuation of application No. PCT/CN2010/074657, filed on Jun. 29, 2010.

(30) Foreign Application Priority Data

Jun. 29, 2009 (CN) .......................... 2009 1 0139568

(51) Int. Cl.
*H04W 4/00* (2009.01)
*H04J 11/00* (2006.01)
*H04L 5/00* (2006.01)
*H04B 7/02* (2006.01)

(52) U.S. Cl.
CPC ........... *H04L 5/0048* (2013.01); *H04J 11/0056* (2013.01); *H04B 7/024* (2013.01); *H04L 5/0035* (2013.01)
USPC .......................................... 370/329; 370/208

(58) Field of Classification Search
USPC .......................... 370/208, 203, 204, 329, 330
See application file for complete search history.

(56) References Cited

U.S. PATENT DOCUMENTS

| 2002/0085641 | A1* | 7/2002 | Baum ........................... 375/260 |
| 2008/0273491 | A1* | 11/2008 | Han et al. ...................... 370/329 |
| 2011/0237270 | A1* | 9/2011 | Noh et al. ...................... 455/450 |

FOREIGN PATENT DOCUMENTS

| CN | 1921463 A | 2/2007 |
| CN | 101340227 A | 1/2009 |
| CN | 101340228 A | 1/2009 |

(Continued)

OTHER PUBLICATIONS

1st Office Action in corresponding Chinese Patent Application No. 201080003641.2 (May 6, 2013).

(Continued)

*Primary Examiner* — Dady Chery
(74) *Attorney, Agent, or Firm* — Leydig, Voit & Mayer, Ltd.

(57) ABSTRACT

Embodiments of the present invention disclose a method, an apparatus, and a system for processing a reference signal. The present invention relates to the field of radio communications technologies, and solves a technical problem that it is impossible to meet a requirement for measurement of downlink channels of multiple cells in a coordinated multipoint transmission/reception (CoMP) scenario in the prior art. According to the embodiments of the present invention, a reference signal is sent in a specified pilot position to a target user equipment (UE) where data puncturing is performed, in positions corresponding to the specified pilot position, with respect to data symbols simultaneously sent by an evolved NodeB (eNB) to which another cell in a CoMP set of the UE belongs, and the specified pilot position is orthogonally separated from a reference signal pilot position of the another cell in the CoMP set.

14 Claims, 10 Drawing Sheets

(56) References Cited

FOREIGN PATENT DOCUMENTS

| CN | 101453438 A | 6/2009 |
|---|---|---|
| JP | 2012510772 A | 5/2012 |
| WO | WO 2008058551 A1 | 5/2008 |
| WO | WO 2008/136614 A2 | 11/2008 |
| WO | WO 2010048142 A1 | 4/2010 |
| WO | WO 2010064842 A2 | 6/2010 |

OTHER PUBLICATIONS

1st Office Action in corresponding Japanese Patent Application No. 2012-518015 (May 7, 2013).

Extended European Search Report in corresponding European Patent Application No. 10793597.5 (Aug. 20, 2012).

"R1-090070—Resource Mapping Issues on JP Transmission in CoMP," 3GPP TSG RAN WG1 Meeting #55bis, Jan. 12-16, 2009, 3GPP, Valbonne, France.

"R1-090129—Further Discussion on the Downlink Coordinated Transmission—Impact on the Radio Interface," 3GPP TSG RAN WG1 Meeting #55bis, Jan. 12-16, 2009, 3GPP, Valbonne, France.

Written Opinion of the International Searching Authority in corresponding PCT Application No. PCT/CN2010/074657 (Oct. 21, 2010).

International Search Report in corresponding PCT Application No. PCT/CN2010/074657 (Oct. 21, 2010).

\* cited by examiner

METHOD, APPARATUS, AND SYSTEM FOR PROCESSING REFERENCE SIGNAL

CROSS-REFERENCE TO RELATED APPLICATIONS

This application is a continuation of International Application No. PCT/CN2010/074657, filed on Jun. 29, 2010, which claims priority to Chinese Patent Application No. 200910139568.0, filed on Jun. 29, 2009, both of which are hereby incorporated by reference in their entireties.

FIELD OF THE INVENTION

The present invention relates to the field of radio communications technologies, and in particular, to a method, an apparatus, and a system for processing a reference signal.

BACKGROUND OF THE INVENTION

In a radio communication system, in order to perform efficient radio resource scheduling, an evolved NodeB (eNB) must obtain sufficient and accurate downlink channel information. Currently, the information is obtained by means of measurement and reporting performed by user equipment (UE).

The method for measurement and reporting mainly includes: A serving eNB sends certain reference information to a served UE; after receiving a common reference signal (CRS), the served UE calculates and obtains downlink channel information through measurement; and the served UE properly quantizes the measured downlink channel information according to a rule and feeds back the quantized downlink channel information to the eNB.

In addition, a CRS is defined in the prior art for the preceding method.

With the development of radio communication technologies, a coordinated multipoint transmission/reception (CoMP) technology is introduced in the industry. In the CoMP technology, multiple cells that may serve a UE constitute one CoMP set, and the neighboring eNBs to which each of the cells in the CoMP set belongs jointly provide a data transmission service for the UE, so that the UE may obtain higher throughput and raise signal transmission efficiency. In a CoMP scenario, which is different from a conventional scenario where a UE is served by a single cell, the UE needs to measure reference signals sent by multiple eNBs and feed back the downlink channel information that is obtained through measurement to the multiple eNBs.

With reference to the foregoing description, FIG. 1 shows one exemplary radio communication system. This example includes Cell 1, Cell 2, Cell 3, and UE 1, where Cell 1 is a serving cell of UE 1, and Cell 1, Cell 2, and Cell 3 jointly form a CoMP set of UE 1. UE 1 performs a modulo operation according to a Cell 1-ID of the serving cell to calculate and obtain a pilot position of a CRS that is sent by an eNB to which Cell 1 belongs to UE 1, and UE 1 receives, in the CRS position, the CRS sent by the eNB to which Cell 1 belongs, measures and obtains the downlink channel information in Cell 1 according to the CRS, and then properly quantizes and feeds back the downlink channel information to the eNB to which Cell 1 belongs. As shown in FIG. 2, this diagram represents reference signals in a downlink subframe of the eNB to which Cell 1 belongs, where a black block represents a sent CRS, a white block represents a data symbol, and a dashed-line block represents a sent reference signal for another purpose.

According to the foregoing description, the inventor discovers that the prior art has at least the following problems:

1. The UE can calculate and obtain only the CRS pilot position of the cell according to the cell ID of the serving cell, and cannot obtain a CRS pilot position of another cell in the CoMP set, and therefore cannot evaluate the downlink channel information according to a CRS of the another cell.

2. Even if the UE knows an ID of the another cell in the CoMP set, in the current industry, it is stipulated that a downlink pilot position of a cell may be shifted by implicit mapping which binds the pilot position to a cell ID, to ensure that the CRSs of neighboring cells do not collide with each other. However, the shift operation as set forth in the stipulation can ensure only that a CRS has three possibilities of shift, that is, through the CRS, the UE can distinguish only downlink channels of three different cells at most, but a CoMP set generally includes multiple cells that may coordinate in data transmission. In this case, the CRSs of the cells are very likely to collide with each other, resulting in a measurement error of the downlink channels.

3. Even if the CRSs of all cells in a CoMP set are staggered and do not collide, the CRS of each cell may collide with a data symbol sent by another cell. For example, a CRS from Cell 2 collides with a data symbol from Cell 1. Because Cell 2 is a non-serving cell, for UE 1, strength of a downlink channel from Cell 2 is weaker than that from Cell 1. Consequently, the data symbol causes strong interference to the CRS of Cell 2, and UE 1 is unable to correctly measure and obtain the downlink channel from Cell 2 according to the CRS.

In summary, in a CoMP scenario, the method in the prior art is unable to meet a requirement of enabling a UE to receive CRSs sent by eNBs to which multiple cells belong and accurately evaluate and obtain information about multiple downlink channels according to the CRSs.

SUMMARY OF THE INVENTION

Embodiments of the present invention provide a method, an apparatus, and a system for processing a reference signal, which can meet a requirement of enabling a UE to measure downlink channels of multiple cells in a CoMP scenario.

To achieve the foregoing objective, the embodiments of the present invention adopt the following technical solutions:

A method for processing a reference signal includes:

sending, in a specified pilot position, a reference signal to a target UE, and performing, in positions corresponding to the specified pilot position, data puncturing with respect to data symbols that are simultaneously sent by an eNB to which another cell in a CoMP set of the UE belongs;

where, the specified pilot position is orthogonally separated from a reference signal pilot position of another cell in the CoMP set; and the another cell is a cell other than a cell corresponding to the specified pilot position.

A method for processing a reference signal includes:

receiving a reference signal in a specified pilot position, where data puncturing is respectively performed with respect to data symbols of another cell in a CoMP set that provides a service in positions corresponding to the specified pilot position; and detecting and, measuring according to the reference signal, a corresponding downlink channel, without detecting the data-punctured positions in the data symbols of the another cell;

where, the specified pilot position is orthogonally separated from a reference signal pilot position of the another cell; and the another cell is a cell other than a cell corresponding to the specified pilot position.

An apparatus for processing a reference signal includes:

a sending module, configured to send, in a specified pilot position, a reference signal to a target UE, where the specified pilot position is orthogonally separated from a reference signal pilot position of another cell in a CoMP set of the UE, and the another cell is a cell other than a cell corresponding to the specified pilot position; and/or a puncturing module, configured to perform data puncturing with respect to a sent data symbol, where a data-punctured position corresponds to at least one reference signal pilot position of another cell in the CoMP set.

An apparatus for processing a reference signal includes:

a receiving module, configured to receive a reference signal in a specified pilot position, where data puncturing is performed with respect to data signals of another cell in a CoMP set that provides a service in positions corresponding to the specified pilot position, the specified pilot position is orthogonally separated from a reference signal pilot position of the another cell, and the another cell is a cell other than a cell corresponding to the specified pilot position; and a measuring module, configured to detect, and measure according to the reference signal that is received by the receiving module, a corresponding downlink channel, without detecting the data-punctured positions in data symbols of another cell.

A system for processing a reference signal includes:

an apparatus for processing a reference signal, configured to send, in a specified pilot position, a reference signal to a target UE, where the specified pilot position is orthogonally separated from a reference signal pilot position of another cell in a CoMP set of the UE; and/or, perform data puncturing with respect to a sent data symbol, where a data-punctured position corresponds to at least one reference signal pilot position of the another cell in the CoMP set; and a UE, configured to receive the reference signal in the specified pilot position, where data puncturing are performed with respect to reference signals of another cell in the CoMP set providing services in positions corresponding to the specified pilot position, and detect, and measure according to the reference signal, a corresponding downlink channel, without detecting the data-punctured positions in the data symbols of the another cell;

where the another cell is a cell other than a cell corresponding to the specified pilot position.

The solutions to processing reference information according to the embodiments of the present invention have the following beneficial effects: Downlink reference signals of multiple cells are orthogonal to each other, so that the different reference signals of the multiple cells are prevented from colliding with each other; data puncturing are performed with respect to data symbols from another cell in positions corresponding to the specified pilot position, so that the interference from the data symbols of the another cell is avoided and measurement precision of the downlink channels of multiple cells is improved, thereby meeting the requirement of enabling a UE to measure downlink channels of multiple cells in a CoMP scenario.

BRIEF DESCRIPTION OF THE DRAWINGS

Brief descriptions of the drawings which accompany this application are described hereunder in order to clarify the technical solutions in embodiments of the present invention and in the prior art. The accompanying drawings illustrate only some possible exemplary embodiments of the present invention and those of ordinary skill in the art may obtain other drawings based on these accompanying drawings without creative effort.

DETAILED DESCRIPTION OF THE EMBODIMENTS

The technical solutions of the embodiments of the present invention are described clearly and completely below with reference to the accompanying drawings in the embodiments of the present invention. It is evident that the embodiments described herein are only some exemplary embodiments of the present invention, rather than all embodiments of the present invention. All other embodiments that those of ordinary skill in the art obtain without creative efforts based on the embodiments of the present invention also fall within the scope of the present invention. Furthermore, the sequence and sequence numbers of the embodiments are irrelevant to the preferred sequence of execution of the present invention.

Embodiment 1

Figure 3:
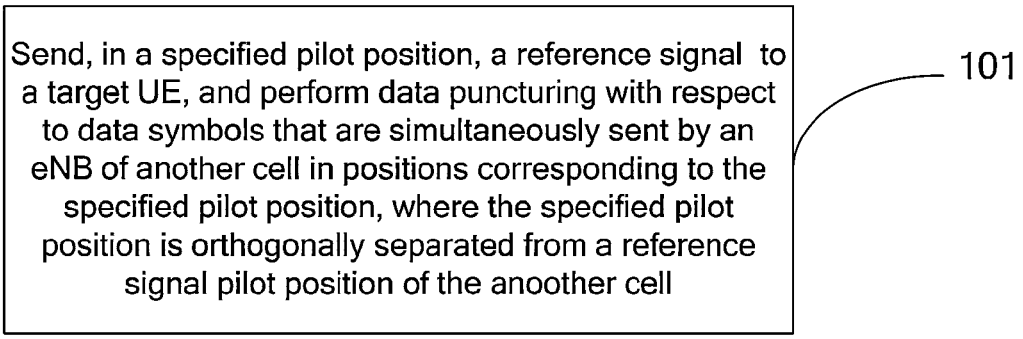
FIG. 3 is a schematic flowchart of a method for processing a reference signal on a network side according to a first embodiment of the present invention.

This embodiment provides a method for processing a reference signal, where the method is suitable for being deployed on a network side. As shown in FIG. 3, the method includes:

Step 101: An eNB to which a cell belongs sends, in a specified pilot position, a reference signal to a target UE, and data puncturing is performed with respect to data symbols that are simultaneously sent by an eNB of another cell in a CoMP set to which this cell belongs in positions corresponding to the specified pilot position.

The specified pilot position is orthogonally separated from a reference signal pilot position of another cell in the CoMP set; and the another cell is a cell other than a cell corresponding to the specified pilot position. That is, the CoMP set consists of the cell corresponding to the specified pilot position and the another cell.

Figure 4:
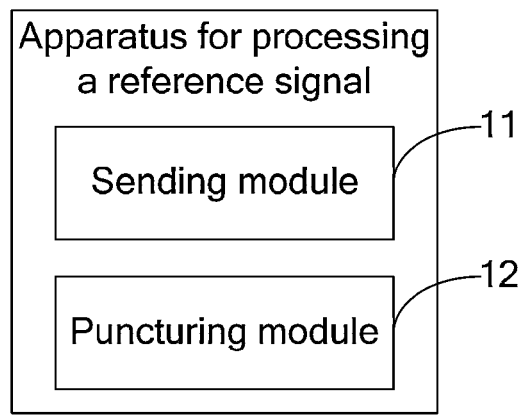
FIG. 4 is a schematic structural diagram of an apparatus for processing a reference signal on a network side according to the first embodiment of the present invention.

Corresponding to the foregoing method, this embodiment further provides an apparatus for processing a reference signal. As shown in FIG. 4, the apparatus includes: a sending module 11 and a puncturing module 12.

The sending module 11 is configured to send, in a specified pilot position, a reference signal to a target UE, where the specified pilot position is orthogonally separated from a reference signal pilot position of another cell in the CoMP set to which the UE belongs; and when the eNB to which the another cell in the CoMP set belongs sends respective data symbols, the puncturing module 12 is configured to perform data puncturing with respect to the sent data symbols, where a data-punctured position corresponds to at least one reference signal pilot position of another cell in the CoMP set.

The method and apparatus for processing a reference signal according to this embodiment of the present invention adopt the following technical solution: Downlink reference signals of multiple cells are orthogonal to each other, and data puncturing is performed in the reference signal pilot position of another cell, which solves a technical problem of collision between reference signals of different cells in a CoMP scenario in the prior art, avoids interference of data symbols of the another cell, and improves measurement precision of downlink channels of multiple cells, thereby meeting a requirement of performing measurement of downlink channels of multiple cells in a CoMP scenario.

Embodiment 2

Figure 5:
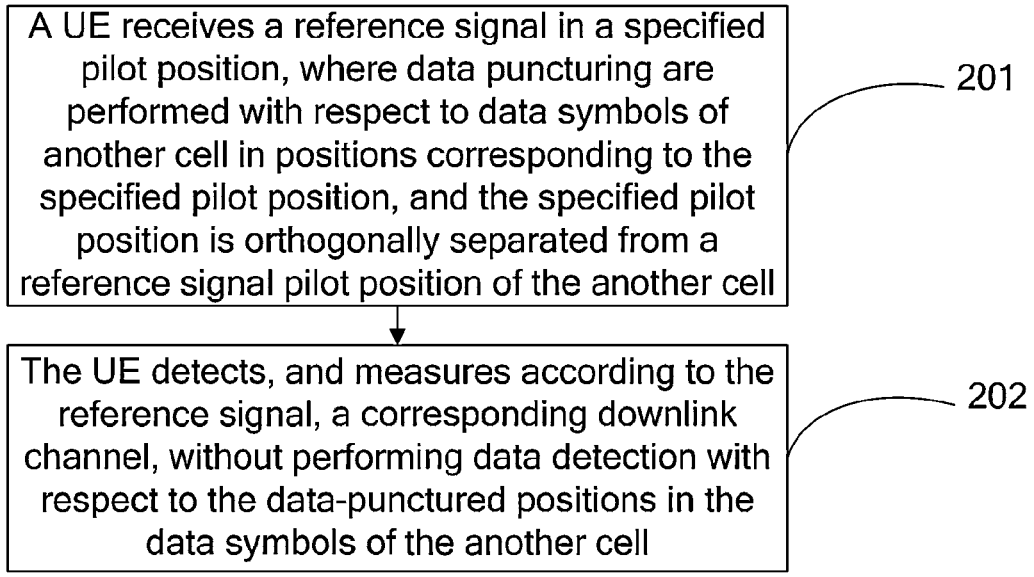
FIG. 5 is a schematic flowchart of a method for processing a reference signal on a user side according to a second embodiment of the present invention.

This embodiment provides a method for processing a reference signal, where the method is suitable for being deployed on a user side. As shown in FIG. 5, the method includes:

Step 201: A UE receives a reference signal in a specified pilot position, where data puncturing are respectively performed with respect to data symbols of another cell in a CoMP set that provides a service in positions corresponding to the specified pilot position.

The specified pilot position is orthogonally separated from a reference signal pilot position of the another cell; and the another cell is a cell other than a cell corresponding to the specified pilot position.

Step 202: The UE detects, and measures according to the reference signal, a corresponding downlink channel, without performing data detection with respect to the data-punctured positions in the data symbols of the another cell.

For a data-punctured position, the UE considers that no data symbol is transmitted in this position, and a receiver of the UE does not perform data detection in this position, and therefore there is no problem of interference from the data symbols of the another cell.

Figure 6:
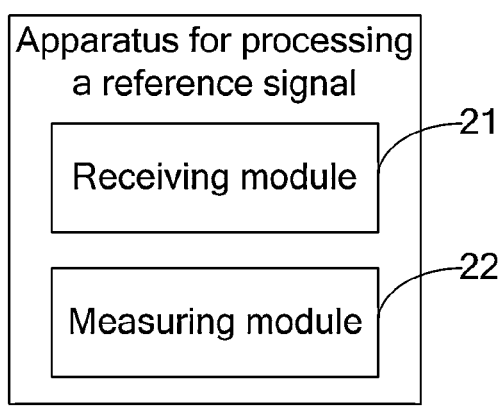
FIG. 6 is a schematic structural diagram of an apparatus for processing a reference signal on a user side according to the second embodiment of the present invention.

Corresponding to the foregoing method, this embodiment further provides an apparatus for processing a reference signal, and specifically, the apparatus may be a UE. As shown in FIG. 6, the UE includes a receiving module 21 and a measuring module 22.

The receiving module 21 is configured to receive a reference signal in a specified pilot position, where data puncturing are performed with respect to data symbols of another cell in a CoMP set that provides a service in positions corresponding to the specified pilot position, the specified pilot position is orthogonally separated from a reference signal pilot positions of the another cell, and the another cell is a cell other than a cell corresponding to the specified pilot position; and the measuring module 22 is configured to detect, and measure according to the reference signal received by the receiving module 21, a corresponding downlink channel, without detecting the data-punctured positions in the data symbols of the another cell.

The method and apparatus for processing a reference signal according to this embodiment have the following beneficial effects: Reference signals of multiple cells are orthogonally separated from each other, so that a problem of collision between different reference signals of multiple cells may be avoided, and meanwhile, because data puncturing is performed with respect to the reference signal pilot position of the another cell, the UE receives no interference from the data symbols of the another cell when receiving a signal. Therefore the following technical effects are achieved: Measurement precision of downlink channels is improved and the UE can measure downlink channels of multiple cells in a CoMP scenario.

Embodiment 3

Figure 1:
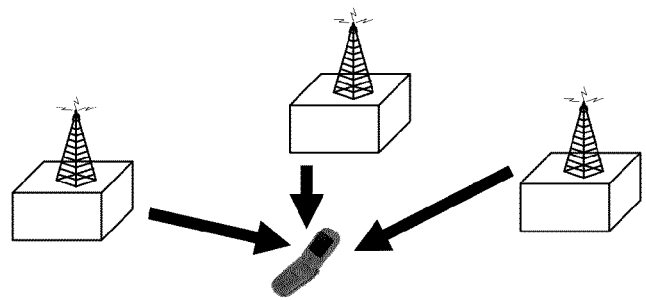
FIG. 1 is a schematic diagram of an exemplary radio communication system.
Figure 2:
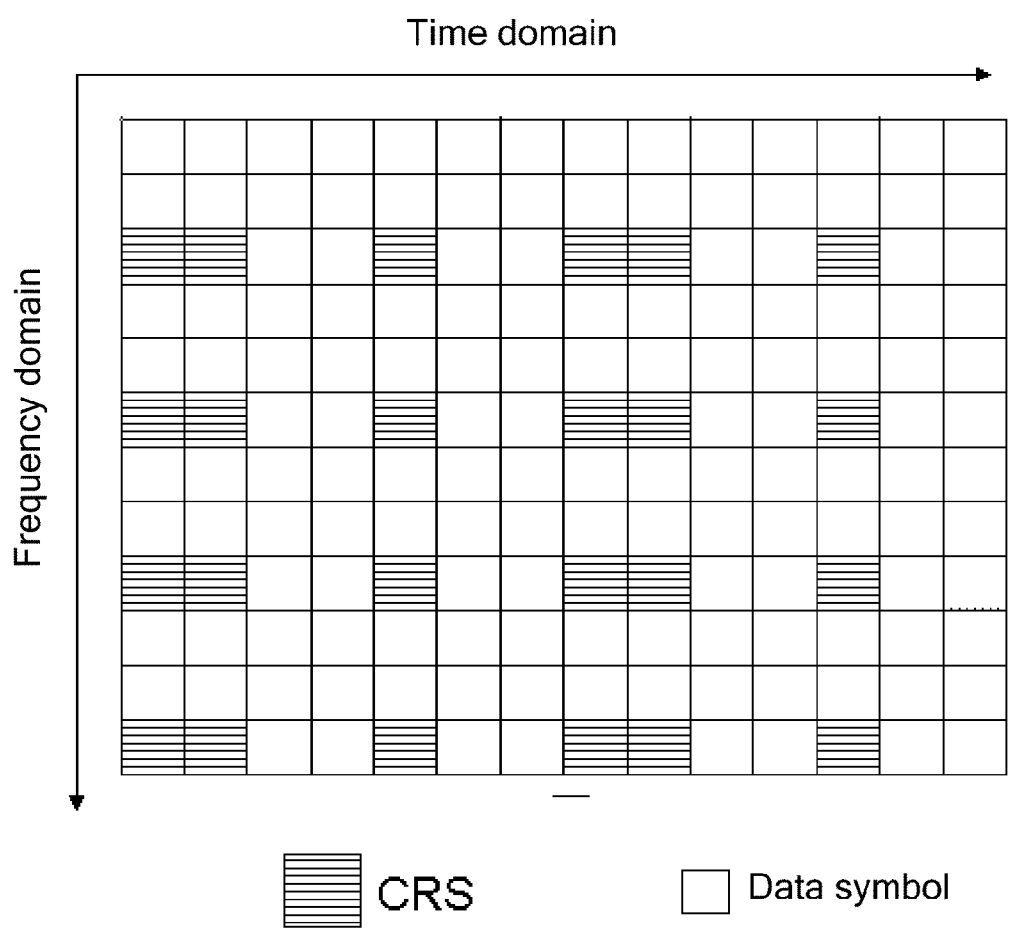
FIG. 2 is a schematic diagram of a CRS pilot position according to the prior art.

With reference to the scenario of the downlink radio communication system shown in FIG. 1, this embodiment specifically provides a method for processing a reference signal.

The method relates to an eNB on a network side and a UE on a user side. In the scenario as shown in FIG. 1, Cell 1, Cell 2, and Cell 3, respectively corresponding to radio eNB 1, eNB 2, and eNB 3, and UE 1 are included. Cell 1 is a serving cell of UE 1, and Cell 1, Cell 2, and Cell 3 jointly form a CoMP set of UE 1. In addition, because a CoMP set is formed only after the eNBs negotiate and interact with each other, each of the cells in the formed CoMP set knows which CoMP set each of the cells belongs to, which cells are included in the CoMP set, and the served UE.

Figure 7:
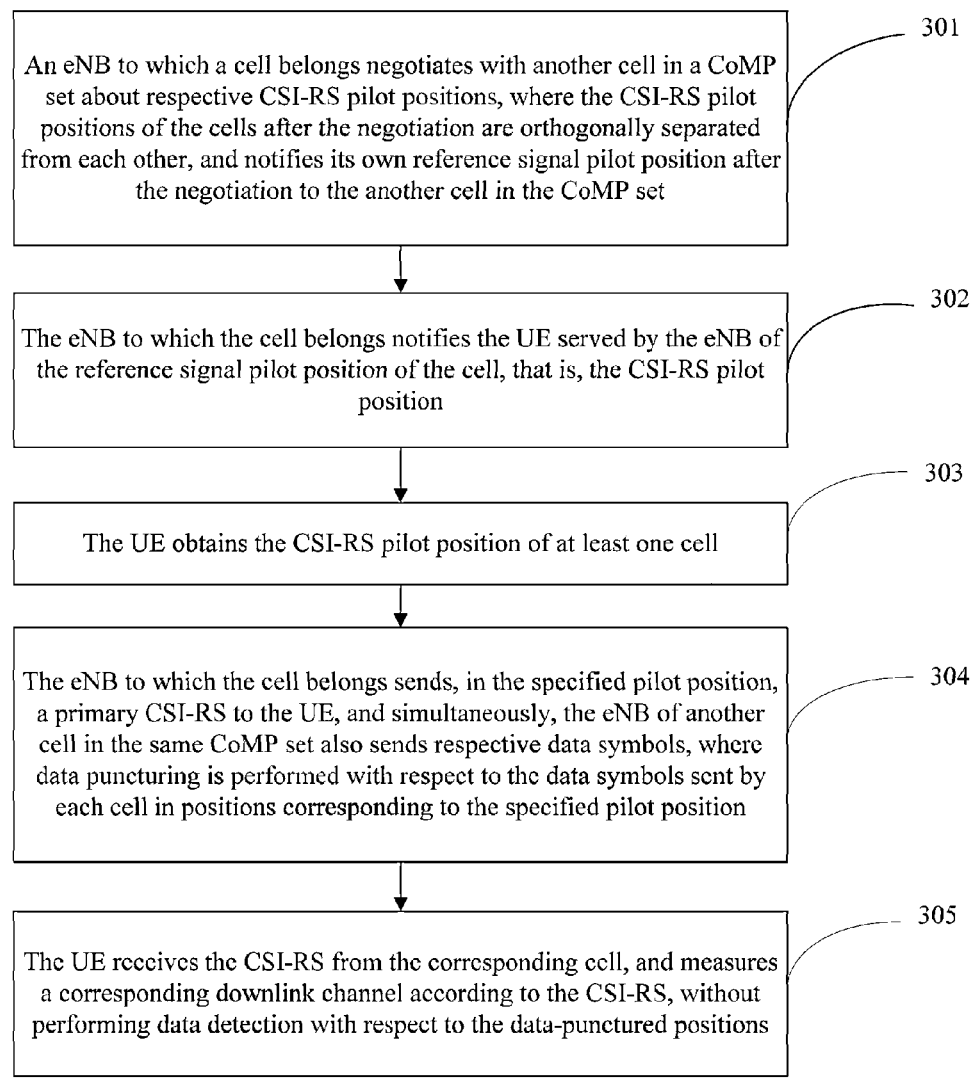
FIG. 7 is a schematic flowchart of a method for processing a reference signal according to a third embodiment of the present invention.

As shown in FIG. 7, the method specifically includes:

Step 301: An eNB to which a cell in the CoMP set belongs negotiates with another cell in the CoMP set about respective reference signal pilot positions through an interface between eNBs (such as an X2 interface and a Common Public Radio Interface (CPRI)), and the reference signal pilot positions of the cells after the negotiation are orthogonally separated in a time-frequency domain multiplexing mode. After obtaining its own reference signal pilot position through the negotiation, the cell sends information including its own reference signal pilot position to the another cell in the CoMP set.

Here, it should be noted that in this embodiment, a channel state information reference signal (CSI-RS) is specifically used as a reference signal. This reference signal is characterized by: a small overhead (the total overhead of up to 8 reference signals is less than 1% of downlink resources); and a long period (5 or 10 subframes). Therefore, in this embodiment, the reference signal is a CSI-RS and the reference signal pilot position is a CSI-RS. In addition, the reference signal pilot position that is negotiated in step 301 includes: a pilot time and a pilot coordinate of the reference signal. The pilot time includes: a pilot period (5 or 10 subframes) and an offset; and the pilot coordinate includes: an abscissa symbol and an ordinate subcarrier.

In this embodiment, step 301 may specifically be as follows: Assuming eNB 2 to which Cell 2 belongs will send a CSI-RS to UE 1, before that, eNB 2 needs to negotiate with eNB 1 and eNB 3 about respective CSI-RS pilot positions, and after the negotiation, the respective CSI-RS pilot positions are orthogonally separated in the time-frequency domain multiplexing mode. After obtaining its own reference signal pilot position through the negotiation, Cell 2 sends information including its own reference signal pilot position to eNB 1 to which Cell 1 belongs and eNB 2 to which Cell 2 belongs.

Figure 8:
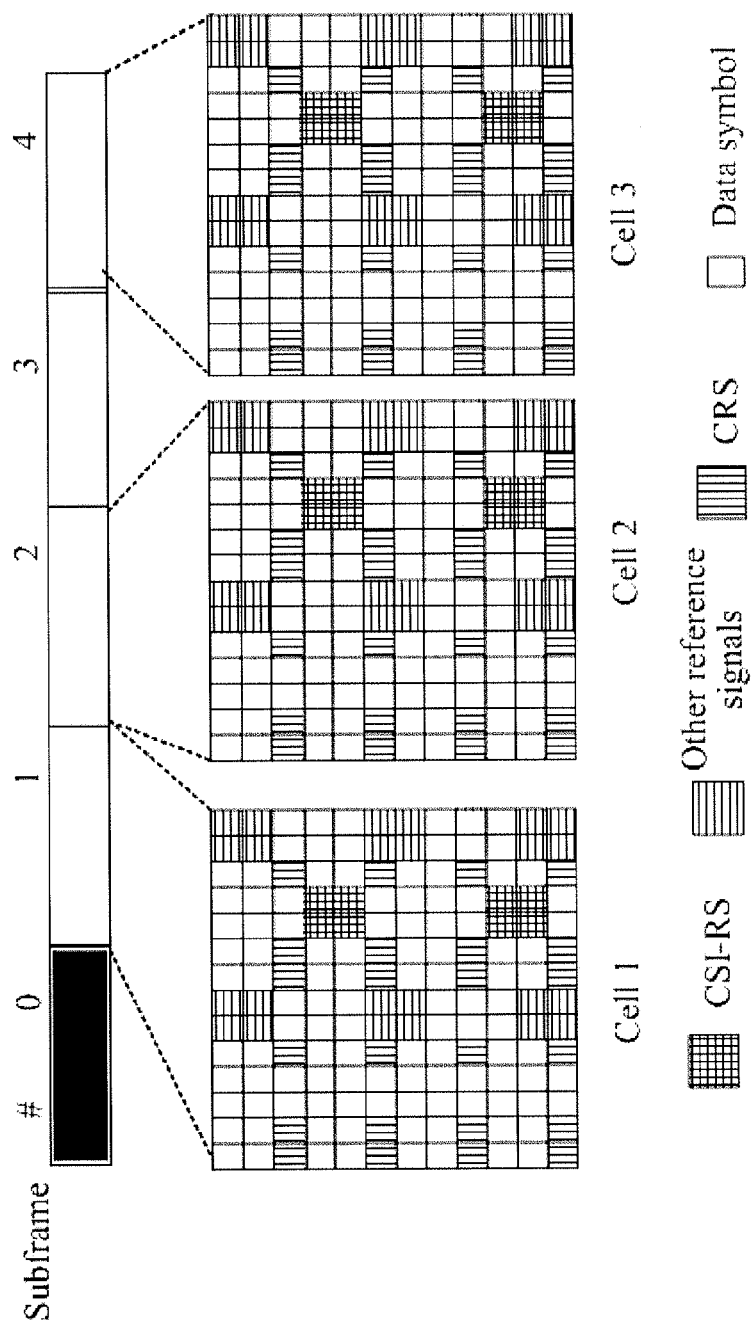
FIG. 8 is a schematic diagram of reference signal pilot positions of cells in a CoMP set according to the third embodiment of the present invention.

In this embodiment, by taking a pilot period of 5 subframes as an example, the respective CSI-RS pilot positions of Cell 1, Cell 2, and Cell 3 after the negotiation are shown in FIG. 8. As can be known from FIG. 8, the period of each cell is 5 subframes, and positions of ordinate subcarriers of the cells are the same, that is, the third and fourth, and the ninth and tenth positions. That is, the same subcarriers are used for transmission. The CSI-RS pilot position of Cell 1 is: Offset 1 (that is, the second subframe), a position of the tenth and eleventh symbols by abscissa; the CSI-RS pilot position of Cell 2 is: Offset 2 (that is, the third subframe), which is also the position of the tenth and eleventh symbols by abscissa; and the CSI-RS pilot position of Cell 3 is: Offset 4 (that is, the fourth subframe), the position of the tenth and eleventh symbols by abscissa.

It should be noted that because it is stipulated that only one of the CSI-RS and the CRS can be used in the industry, and this embodiment uses the CSI-RS, the CRS pilot position in FIG. 8 is used for denoting that this part of resources has been occupied. In addition, other reference signals in FIG. 8 are all resources that have been in use in the prior art and are also used for denoting that this part of resources has been occupied in FIG. 8 of this embodiment.

As can be known from FIG. 8, the respective CSI-RS pilot positions of Cell 1, Cell 2, and Cell 3 are orthogonally separated in time and frequency domains, so that it is ensured that CSI-RSs of different cells do not collide with each other, nor do the CSI-RSs interfere with each other. It should be pointed out that a long-period characteristic of the CSI-RS provides more mutually-orthogonal resources for accommodating the CSI-RSs of multiple cells and ensures that these CSI-RSs do not collide with each other.

In this embodiment, because it is assumed that eNB 2 to which Cell 2 belongs will send a CSI-RS to UE 1, the CSI-RS pilot position of Cell 1 is a specified pilot position, and is also its own reference signal pilot position. Therefore, the pilot time and pilot coordinate of Cell 1 are the current pilot time and the current pilot coordinate. The CSI-RS of Cell 1 is the reference signal, and when eNB 2 sends the CSI-RS of Cell 2, eNB 1 to which Cell 1 belongs simultaneously sends a data symbol of Cell 1, and eNB 3 to which Cell 3 belongs simultaneously sends a data symbol of Cell 3.

Step 302: The eNB to which the cell belongs notifies the UE served by the eNB of the reference signal pilot position of the cell, that is, the CSI-RS pilot position.

Specifically, with Cell2 as an example, eNB 2 to which Cell 2 belongs notifies UE 1 of the specified pilot position of Cell 2.

The notification method may be any one of the following methods:

First method: eNB 2 sends information including a Cell 2-ID to UE 1, where the Cell 2-ID is bound to the specified pilot position of Cell 2, that is, the Cell 2-ID can be mapped to the specified pilot position through implicit mapping.

Second method: eNB 2 sends information including the Cell 2-ID and a virtual ID that is related to a common feature of the CoMP set to UE 1, where the Cell 2-ID and the virtual ID are bound to the specified pilot position of Cell 2, that is, the Cell 2-ID and the virtual ID can be mapped to the specified pilot position through implicit mapping. The common feature may be the same period or the same number of ports of all cells in the CoMP set, or whether the same code division multiplexing (CDM) approach is used in the cells for performing CSI-RS multiplexing.

Third method: eNB 2 sends high-layer signaling including the specified pilot position to UE 1.

Here, it should be noted that: a sequence of execution of step 301 and step 302 is not limited to the sequence described in this embodiment, and step 302 may be executed before step 301, or the two steps may even be executed simultaneously.

Step 303: The UE obtains the CSI-RS pilot position of at least one cell.

This step may specifically be that UE 1 obtains the CSI-RS pilot positions of Cell 1 and Cell 2 respectively.

With respect to the three notification methods in step 302, step 303 may specifically obtain the CSI-RS pilot position through the three methods as described in the following example. Likewise, Cell 2 is taken as an example.

First method: Receive the Cell 2-ID, and perform a modulo operation with respect to the Cell 2-ID to obtain the CSI-RS pilot position of Cell 2.

Specifically, the modulo operation procedure may specifically be similar to a procedure for obtaining a CRS pilot position according to a modulo operation with respect to the Cell 1-ID in the prior art, which is not repeatedly described here.

Second method: Receive the Cell 2-ID and the virtual ID of Cell 2 and obtain the CSI-RS pilot position of Cell 2 by calculating the virtual ID and the Cell 2-ID.

The specific procedure may be: assuming that the received virtual ID of Cell 2 is 0 and that the Cell 2-ID is 4, the UE may find the CSI-RS pilot position of Cell 2 by using the following operation:

Virtual ID mod 2=0 where, 2 denotes that there are two possibilities for the period: 10 subframes and 5 subframes, and the result 0 denotes that the period is 5 subframes.

Cell 2-ID mod 12=4 where, 12 denotes that there are 4×3=12 possible positions of the CSI-RS (because the first subframe in the 5 subframes is generally unavailable, 4 subframes in total are available, and there are 3 possible CSI-RS positions in each subframe, so that there are 12 possible positions in total); the result 4 denotes the fourth position starting from 0, and because positions in the first subframe are 0, 1, and 2, and positions in the second subframe are 3, 4, and 5, 4 denotes the second position in the second subframe.

Therefore, the reference signal pilot position of Cell 2 is: in a period of 5 subframes, Offset 2, the second position.

Third method: Receive high-layer signaling including the CSI-RS pilot position of Cell 2 from eNB 2.

Step 301 to step 303 may be considered to be preparations before the eNB to which the cell belongs sends the CSI-RS. Although the reference signals are sent periodically, the CSI-RS pilot positions that are negotiated by the cells in the foregoing steps and the cell ID and virtual ID that are obtained by the UE and bound to each CSI-RS pilot position generally remain unchanged, and therefore do not need to be reset or changed with periodic sending of the CSI-RS.

Step 304: The eNB to which the cell belongs sends, in the specified pilot position, the CSI-RS to the UE, and simultaneously, the eNB to which another cell in the same CoMP set belongs also sends respective data symbols, where data puncturing is performed with respect to the data symbols sent by each eNB in positions corresponding to the specified pilot position.

As can be known from step 301, the specified pilot position of the cell and the CSI-RS pilot position of the another cell is orthogonally separated in the time and frequency domains.

Figure 9:
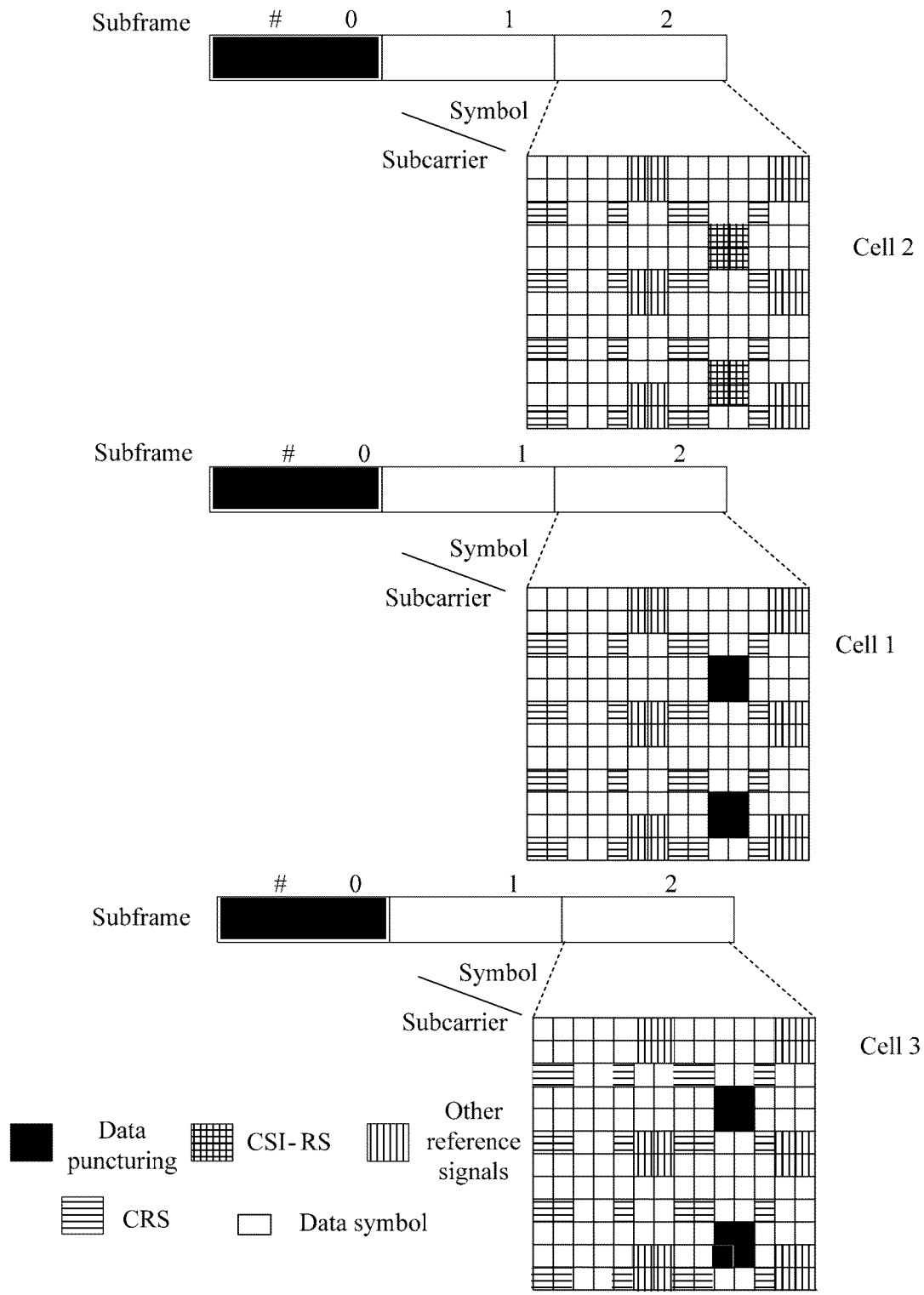
FIG. 9 is a schematic diagram of puncturing of data symbols sent by the cells in the CoMP set according to the third embodiment of the present invention.

Specifically, step 304 may be: eNB 2 to which Cell 2 belongs sends a primary CSI-RS in the specified pilot position, and at the same time, eNB 1 to which Cell 1 belongs sends a data symbol, where data puncturing is performed with respect to the data symbol of Cell 1 in a position corresponding to the specified pilot position of Cell 2, and likewise, eNB 3 to which Cell 3 belongs sends a data symbol at the same time, where data puncturing is performed with respect to the data symbol of Cell 3 in a position corresponding to the specified pilot position of Cell 2. The foregoing description may be represented by FIG. 9.

Step 305: The UE receives, in the specified pilot position, the CSI-RS from the corresponding cell, and measures a corresponding downlink channel according to the CSI-RS, without performing data detection with respect to the data-punctured positions in the data symbols.

For a data-punctured pilot position, the UE considers that no data symbol is transmitted in this position, and a receiver of the UE does not perform data detection in this position, and therefore there is no problem of interference from data symbols of the another cell.

Specifically, step 305 may be: UE 1 receives, in the specified pilot position, the CSI-RS from eNB 2, the data-punctured data symbol from eNB 1, and the data-punctured data symbol from eNB 3. UE 1 measures the downlink channel of Cell 2 according to the primary CSI-RS, and the receiver of UE 1 does not perform data detection with respect to the data-punctured positions in the data symbols of Cell 1 and Cell 3, so that there is no interference from data symbols of Cell 1 and Cell 3 when the downlink channel of Cell 2 is measured.

The foregoing method for processing a reference signal is specifically described by taking one of the cells as an example, and a procedure for processing a reference signal of another cell is similar to the method in this embodiment. A specific implementation method may be readily derived by those skilled in the art according to the foregoing description and therefore is not further described here.

Figure 10:
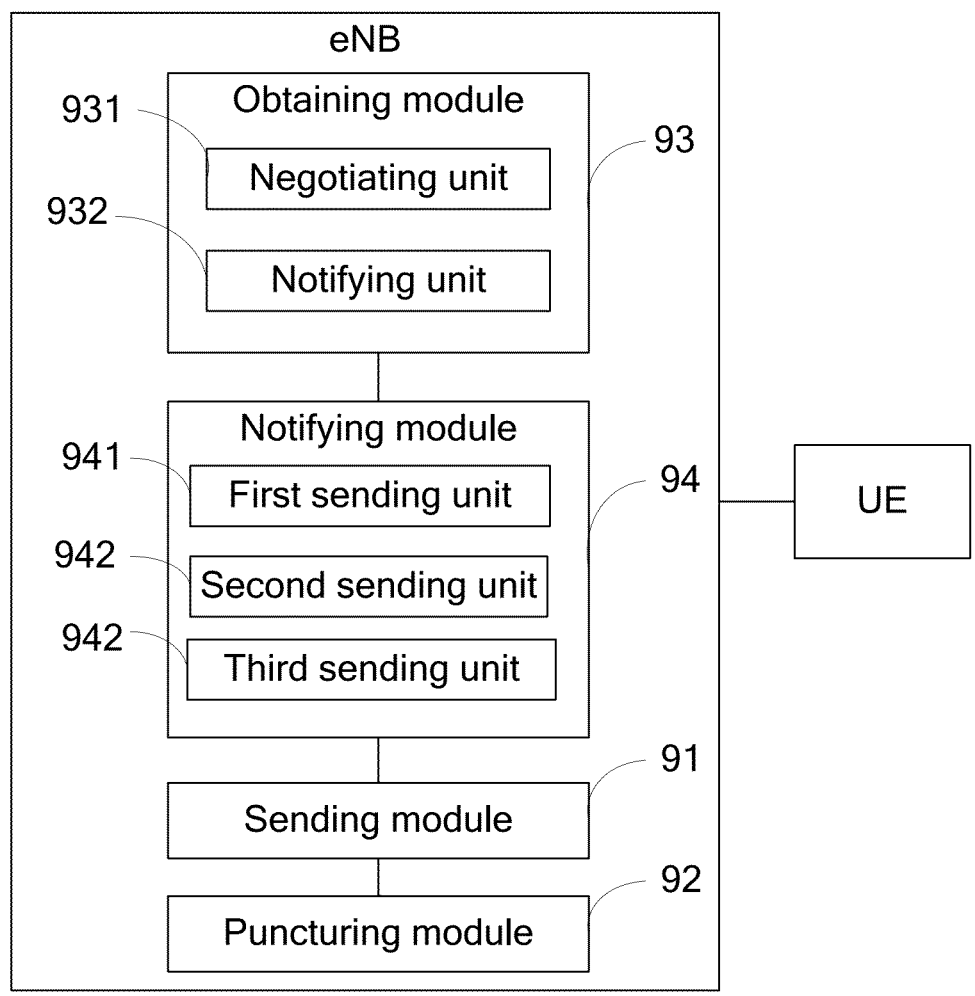
FIG. 10 is a schematic structural diagram of an apparatus for processing a reference signal on a network side according to the third embodiment of the present invention.

Corresponding to the foregoing method, this embodiment further provides an eNB to facilitate implementation of the part of the foregoing method relating to the network side. As shown in FIG. 10, the eNB includes: a sending module 91 and a puncturing module 92.

The sending module 91 is configured to send, in a specified pilot position, a reference signal to a target UE, where the specified pilot position is orthogonally separated from a reference signal pilot position of another cell in a CoMP set to which the UE belongs; and the puncturing module 92 is configured to perform data puncturing with respect to a sent data symbol, where a data-punctured position corresponds to at least one reference signal pilot position of the another cell in the CoMP set.

Further, the eNB in this embodiment also includes the following optional modules: an obtaining module 93 and a notifying module 94.

The obtaining module 93 is configured to obtain a reference signal pilot position of another cell in the CoMP set; and the notifying module 94 is configured to notify the target UE of the specified pilot position.

The obtaining module 93 includes: a negotiating unit 931 and a notifying unit 932.

The negotiating unit 931 is configured to negotiate with the eNB to which another cell in the CoMP set belongs about the reference signal pilot positions, where the reference signal pilot positions of the cells after the negotiation are orthogonally separated in the time-frequency domain multiplexing mode; and the notifying unit 932 is configured to send information including the reference signal pilot position of the cell to the eNBs to which another cell in the CoMP set belongs.

The specified pilot position is: the reference signal pilot position of the cell after the negotiation performed by the negotiating unit 931.

In this embodiment, the notifying module 94 includes at least one of the following units: a first sending unit 941, a second sending unit 942, and a third sending unit 943.

The first sending unit 941 is configured to send information including a cell ID to the target UE, where the cell ID is bound to the specified pilot position; the second sending unit 942 is configured to send information including a cell ID and a virtual ID that is related to the common feature of the CoMP set to the target UE, where the cell ID and the virtual ID are bound to the specified pilot position; and the third sending unit 943 is configured to send high-layer signaling including the specified pilot position to the target UE.

The reference signal mentioned in the foregoing modules is a CSI-RS; the specified pilot position in the foregoing modules includes: the current pilot time and the current pilot coordinate; and the reference signal pilot position in the foregoing modules includes: the pilot time and the pilot coordinate.

Figure 11:
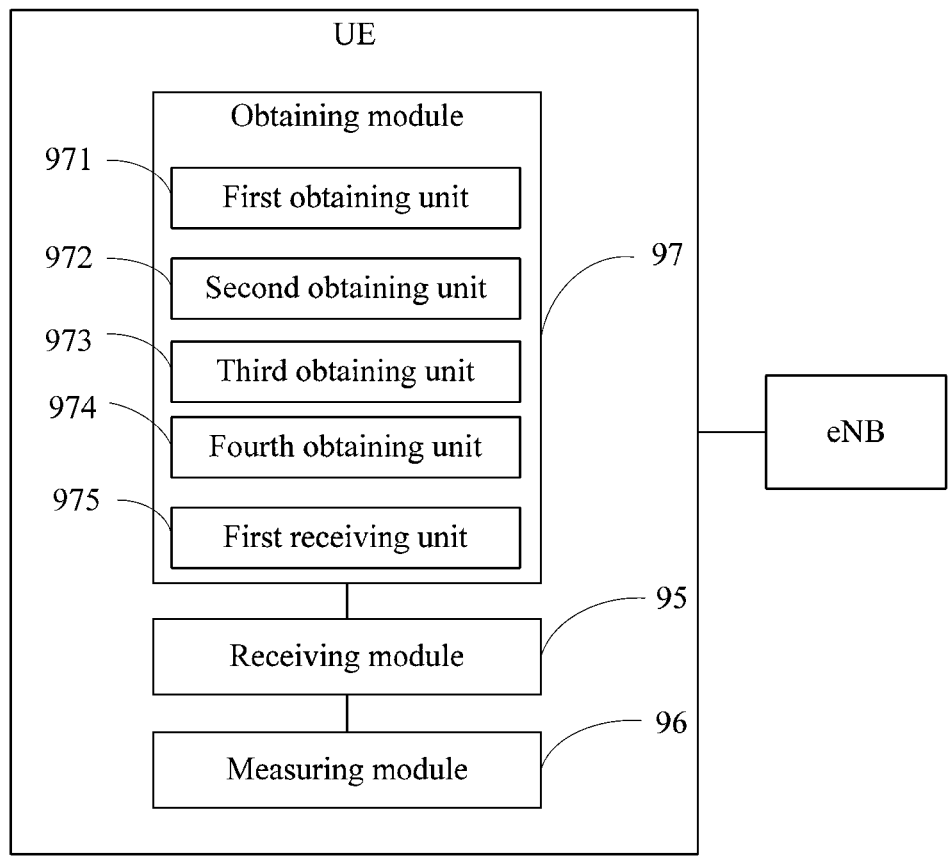
FIG. 11 is a schematic structural diagram of an apparatus for processing a reference signal on a user side according to the third embodiment of the present invention.

Accordingly, this embodiment further provides a UE to facilitate implementation of the part relating to the user side in the foregoing method. As shown in FIG. 11, the UE includes: a receiving module 95 and a measuring module 96.

The receiving module 95 is configured to receive a reference signal in a specified pilot position, where data puncturing is performed with respect to data symbols of another cell in a CoMP set that provides a service in positions corresponding to the specified pilot position, and the specified pilot position is orthogonally separated from a reference signal pilot position of the another cell; and the measuring module 96 is configured to detect, and measure according to the reference signal received by the receiving module 95, a corresponding downlink channel, without detecting the data-punctured positions of the data symbols of the another cell.

The another cell is a cell other than a cell corresponding to the specified pilot position.

Further, this embodiment also includes the following optional module: an obtaining module 97. The obtaining module 97 is configured to obtain a reference signal pilot position of at least one cell, where the at least one cell belongs to the CoMP set that provides the service.

In addition, in this embodiment, the obtaining module 97 includes: a first obtaining unit 971 and a second obtaining unit 972.

The first obtaining unit 971 is configured to obtain a cell ID of at least one cell; and the second obtaining unit 972 is configured to obtain at least one corresponding reference signal pilot position by performing a modulo operation with respect to the cell ID;

The specified pilot position is: any reference signal pilot position, in which a reference signal is received currently, among the at least one reference signal pilot position obtained by the second obtaining unit 972.

Alternatively, the obtaining module 97 includes only a third obtaining unit 973 and a fourth obtaining unit 974; or the obtaining module 97 also includes a third obtaining unit 973 and a fourth obtaining unit 974.

The third obtaining unit 973 is configured to obtain a cell ID of at least one cell and a virtual ID that is related to the common feature of the CoMP set; and the fourth obtaining unit 974 is configured to obtain at least one corresponding reference signal pilot position by performing a calculation with respect to the at least one pair of virtual ID and cell ID.

The specified pilot position is: any reference signal pilot position, in which a reference signal is received currently, among the at least one reference signal pilot position obtained by the fourth obtaining unit 974.

Alternatively, the obtaining module 97 includes only a first receiving unit 975; or the obtaining module 97 also includes a first receiving unit 975 configured to receive at least one piece of high-layer signaling including a reference signal pilot position.

The specified pilot position is: any reference signal pilot position, in which a reference signal is received currently, among the at least one reference signal pilot position received by the first receiving unit 975.

In addition, the reference signal mentioned in the foregoing modules is a CSI-RS; the specified pilot position in the foregoing modules includes: the current pilot time and the current pilot coordinate; and the reference signal pilot position in the foregoing modules includes: the pilot time and the pilot coordinate.

The solution according provided in this embodiment of the present invention has the following beneficial effects: A technical problem that the UE can obtain only the reference signal pilot position according to the cell ID of the serving cell in the prior art is solved; in the solution of this embodiment, the UE may obtain the reference signal pilot positions of all cells in the CoMP set that serves the UE, so the UE may also obtain the reference signals of multiple cells and measure corresponding downlink channels according to the reference signals; the downlink reference signals of multiple cells are orthogonal to each other, so that collision between different reference signals of multiple cells may be avoided; data puncturing is performed in the reference signal pilot position of the another cell, so that the interference from the data symbols of the another cell is avoided and thereby measurement precision of the downlink channels of multiple cells is improved, which meets a requirement of enabling the UE to measure downlink channels of multiple cells in a CoMP scenario.

Embodiment 4

Figure 12:
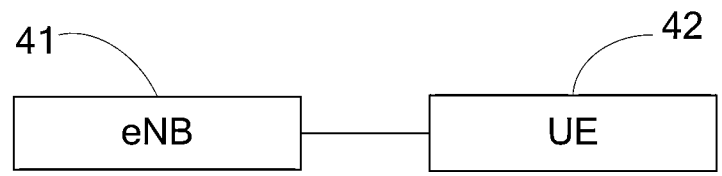
FIG. 12 is a schematic diagram of a system for processing a reference signal according to a fourth embodiment of the present invention.

This embodiment provides a system for processing a reference signal. As shown in FIG. 12, the system includes: an eNB 41 and a UE 42.

The eNB 41 is configured to send, in a specified pilot position, a reference signal to a target UE 42, where the specified pilot position is orthogonally separated from a reference signal pilot position of another cell in a CoMP set to which UE 42 belongs; and the eNB 41 is also configured to perform data puncturing with respect to a sent data symbol, where a data-punctured position corresponds to at least one reference signal pilot position of the another cell in the CoMP set. The UE 42 is configured to receive, in the specified pilot position, the reference signal from the eNB 41, where data puncturing is performed with respect to the data symbols of the another cell in the CoMP providing services in positions corresponding to the specified pilot position; and detect, and measure according to the reference signal, a corresponding downlink channel, without detecting the data-punctured positions in the data symbols of the another cell.

The another cell is a cell other than a cell corresponding to the specified pilot position.

The system for processing a reference signal provided in this embodiment adopts the following technical solution: Reference signals of multiple cells are orthogonally separated and data puncturing is performed with respect to the reference signal pilot position of the another cell, which solves technical problems that different reference signals of multiple cells collide and interfere with each other and that the UE receive interference from data symbols of the another cell when receiving a signal in the prior art, and thereby achieves technical effects of improving measurement precision of downlink channels and enabling the UE to measure downlink channels of multiple cells in a CoMP scenario.

Embodiment 5

This embodiment provides a system for processing a reference signal. The system includes: an eNB and a UE.

Figure 13:
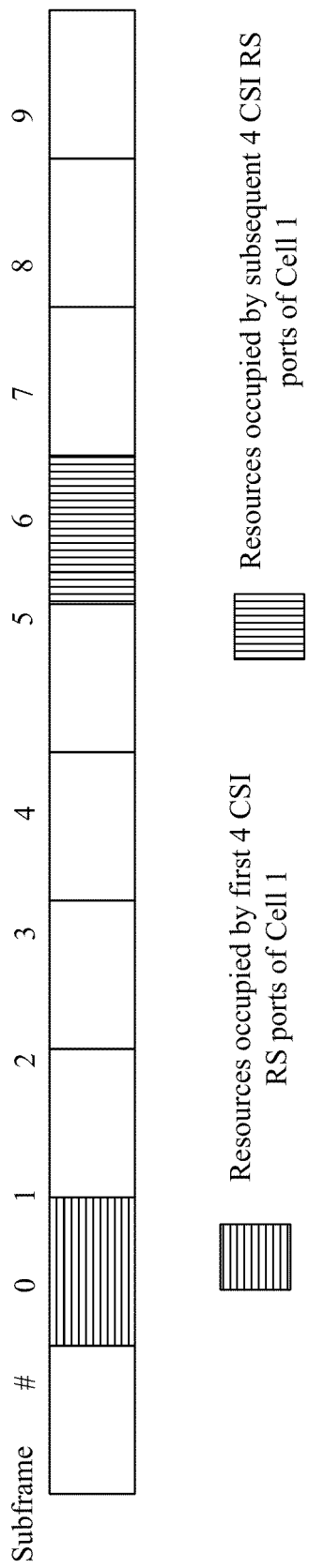
FIG. 13 is a schematic diagram of resources occupied by a first type of reference signal port according to a fifth embodiment of the present invention.

The eNB has 8 CSI-RS ports in total. The eNB divides the 8 CSI-RS ports into two parts, where each part includes 4 CSI-RS ports and each port sends, in a specified pilot position, a CSI-RS pilot signal to the target UE with a pilot period of 5 subframes (that is, the period for each port to send its CSI-RS is the same as a pilot period), and the pilot position used by each CSI-RS port for sending its CSI-RS may be notified to the UE by binding to the cell ID (in this embodiment, the pilot position is the second subframe in the 5-subframe period). The two parts of CSI-RS ports send respective CSI-RSs at intervals, that is, for any one of the CSI-RS ports, an actual period for sending a corresponding CSI-RS becomes 10 subframes. As shown in FIG. 13, Cell 1 is taken as an example, and it is assumed that an eNB to which Cell 1 belongs is the eNB in this embodiment.

The eNB is configured to send, in the specified pilot position, CSI-RSs corresponding to first 4 CSI-RS ports through the first 4 CSI-RS ports in the first pilot period (that is, the first 5 subframes), and the eNB is also configured to send, in the specified pilot position, CSI-RSs corresponding to subsequent 4 CSI-RS ports through the subsequent 4 CSI-RS ports in the second pilot period. The CSI-RSs are sent alternately and cyclically like this, where in any pilot period, the specified pilot position is orthogonally separated from a reference signal pilot position of another cell in the CoMP set to which the UE belongs; and the eNB is also configured to perform data puncturing with respect to a sent data symbol, where a data-punctured position corresponds to at least one reference signal pilot position of another cell in the CoMP set.

The UE is configured to receive, in the specified pilot position, the CSI-RSs from the first 4 CSI-RS ports of the eNB in the first pilot period, and receive, in the specified pilot position, the CSI-RSs from the subsequent 4 CSI-RS ports of the eNB in the second pilot period. In this way, required CSI-RSs may be received alternately and cyclically. In any pilot period, data puncturing is performed with respect to the data symbols of the another cell in the CoMP that provides a service in positions corresponding to the specified pilot position. In addition, the UE is configured to detect, and measure according to the reference signal, a corresponding downlink channel, without detecting the data-punctured positions in the data symbols of the another cell.

Alternatively, the eNB has 8 CSI-RS ports in total, and the eNB divides the 8 CSI-RS ports into two parts according to a period: The first part is CSI-RS ports sending CSI-RSs with a period of 5 subframes, and the other part is CSI-RS ports sending CSI-RS with a period of 10 subframes. Both the two parts send, in the specified pilot position, CSI-RS pilot signals to the target UE, and the pilot period of the cell is still 5 subframes.

Figure 14:
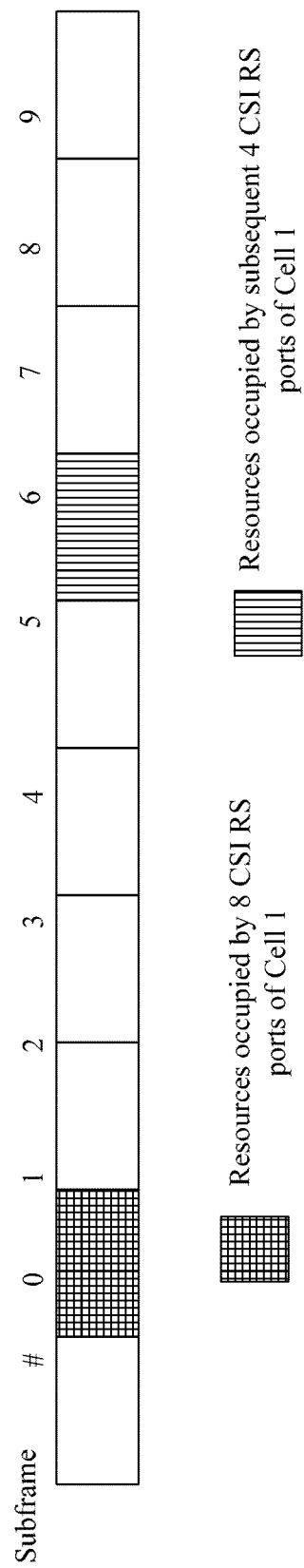
FIG. 14 is a schematic diagram of resources occupied by a second type of reference signal port according to the fifth embodiment of the present invention.

According to a condition of resources occupied by each CSI-RS port, information including resources occupied by each port may be sent to the UE. For example, it is assumed that: the first 4 CSI-RS ports take 5 subframes as a period, 6 resource elements (REs) are occupied in one pilot period, and 4 REs are occupied in a next pilot period, where an RE is a minimum block in FIG. 8; the subsequent 4 CSI-RS ports take 10 subframes as a period, and 6 REs are occupied in each pilot period. At this time, for the UE, the CSI-RS ports detected in each pilot period are different, so the UE needs to be notified of which resources are used to send the reference signals in each pilot period. As shown in FIG. 14, Cell 1 is taken as an example, and it is assumed that the eNB to which Cell 1 belongs is the eNB in this embodiment.

The eNB is configured to send, in the specified pilot position, CSI-RSs corresponding to 8 CSI-RS ports through the 8 CSI-RS ports in the first pilot period (that is, the first 5 subframes), and the eNB is also configured to send, in the specified pilot position, CSI-RSs corresponding to subsequent 4 CSI-RS ports through the subsequent 4 CSI-RS ports in the second pilot period. The CSI-RSs are sent alternately and cyclically like this, where in any pilot period, the specified pilot position is orthogonally separated from a reference signal pilot position of another cell in the CoMP set to which the UE belongs; and the eNB is also configured to perform data puncturing with respect to a sent data symbol, where a data-punctured position corresponds to at least one reference signal pilot position of the another cell in the CoMP set.

The UE is configured to receive, in the specified pilot position, the CSI-RSs from the 8 CSI-RS ports of the eNB in the first pilot period, and receive, in the specified pilot position, the CSI-RSs from the subsequent 4 CSI-RS ports of the eNB in the second pilot period. In this way, the required CSI-RSs may be received alternately and cyclically. In any pilot period, data puncturing is performed with respect to the data symbols of the another cell in the CoMP set that provides the service in positions corresponding to the specified pilot position. In addition, the UE is configured to detect, and measure according to the reference signal, a corresponding downlink channel, without detecting the data-punctured positions in the data symbols of the another cell.

The system for processing a reference signal provided in this embodiment solves technical problems that different reference signals of multiple cells collide and interfere with each other and that the UE receives interference from data symbols of the another cell when receiving a signal in the prior art, and thereby achieves technical effects of improving measurement precision of downlink channels and enabling the UE to measure downlink channels of multiple cell in a CoMP scenario. Meanwhile, in the technical solution of this embodiment, reference signal ports use different periods to send respective reference signals, which solves a technical problem of a large overhead that is caused by that the reference signals are sent through multiple reference signal ports in one pilot period in the prior art.

Through the description of the foregoing embodiments, those skilled in the art may clearly understand that the present invention may be implemented by software and a necessary general hardware platform, or by hardware only, but the former is preferred in many cases. Based on such understanding, the technical solutions of the present invention, or the portions contributing to the prior art may be embodied in the form of a software product. The computer software product is stored in a readable storage medium, such as a floppy disk, a hard disk, or a Compact Disk-Read Only Memory (CD-ROM) of a computer, and includes several instructions to instruct a device (which may be a radio network controller) to execute the method described in each embodiment of the present invention.

Detailed above are only exemplary embodiments of the present invention, but the protection scope of the present invention is not limited thereto. Any modification or substitution readily conceivable by those skilled in the art within the scope of the technology disclosed herein shall fall within the protection scope of the present invention. Therefore, the protection scope of the present invention is subject to the appended claims.

What is claimed is:

1. A method for processing a reference signal, comprising:
   sending, by an evolved NodeB (eNB) of a cell belonging to a coordinated multipoint transmission/reception (CoMP) set in a specified pilot position, a reference signal to a target user equipment (UE), and performing data puncturing with respect to data symbols that are simultaneously sent by an eNB of another cell in the CoMP set in positions corresponding to the specified pilot position; and
   obtaining the reference signal pilot position of the another cell in the CoMP set;
   wherein, the specified pilot position is orthogonally separated from a reference signal pilot position of another cell in the CoMP set;
   wherein the another cell is a cell other than a cell corresponding to the specified pilot position; and
   wherein the step of obtaining the reference signal pilot position of the another cell in the CoMP set comprises:
      negotiating with the eNB of the another cell in the CoMP set about the reference signal pilot position of the another cell in the CoMP set, wherein reference signal pilot positions of cells of the CoMP set after the negotiation are orthogonally separated in a time-frequency domain multiplexing mode; and
      sending information comprising rising a reference signal pilot position of a particular cell to the eNB of the another cell in the CoMP set; and
   wherein, the specified pilot position is the reference signal pilot position of the particular cell after negotiation.

2. The method for processing a reference signal according to claim 1, wherein the reference signal is a channel state information reference signal;
   wherein the specified pilot position comprises: a current pilot time and a current pilot coordinate; and
   wherein the reference signal pilot position comprises a pilot time and a pilot coordinate.

3. The method for processing a reference signal according to claim 1, wherein the method further comprises:
   notifying the target UE of the specified pilot position.

4. The method for processing a reference signal according to claim 3, wherein the notifying the target UE of the specified pilot position comprises at least one of:
   sending information comprising a cell identifier (ID) to the target UE, wherein the cell ID is bound to the specified pilot position; or
   sending information comprising a cell ID and a virtual ID that is related to a common feature of the CoMP set to the target UE, wherein the cell ID and the virtual ID are bound to the specified pilot position; or sending high-layer signaling comprising the specified pilot position to the target UE.

5. A method for processing a reference signal, comprising:
receiving a reference signal in a specified pilot position, wherein data puncturing is respectively performed with respect to data symbols of another cell in a coordinated multipoint transmission/reception (CoMP) set that provides a service in positions corresponding to the specified pilot position; and
detecting and, measuring according to the reference signal, a corresponding downlink channel, without detecting the data-punctured positions in the data symbols of the another cell; and
obtaining a reference signal pilot position of at least one cell, wherein the at least one cell belongs to the CoMP set that provides the service;
wherein, the specified pilot position is orthogonally separated from a reference signal pilot position of the another cell;
wherein the another cell is a cell other than a cell corresponding to the specified pilot position;
wherein the obtaining the reference signal pilot position of at least one cell comprises:
obtaining a cell identity (ID) of at least one cell; and
obtaining at least one corresponding reference signal pilot position by performing a modulo operation with respect to the at least one cell ID; and
wherein the specified pilot position is any reference signal pilot position, in which a reference signal is received currently among the at least one reference signal pilot position.

6. The method for processing a reference signal according to claim 5, wherein the reference signal is a channel state information reference signal;
wherein the specified pilot position comprises a current pilot time and a current pilot coordinate; and
wherein the reference signal pilot position comprises: a pilot time and a pilot coordinate.

7. An apparatus for processing a reference signal, comprising:
a sending module, configured to send, in a specified pilot position, a reference signal to a target user equipment (UE), wherein the specified pilot position is orthogonally separated from a reference signal pilot position of another cell in a belonged coordinated multipoint transmission/reception (CoMP) set, and the another cell is a cell other than a cell corresponding to the specified pilot position;
a puncturing module, configured to perform data puncturing with respect to a sent data symbol, wherein a data-punctured position corresponds to at least one reference signal pilot position of the another cell in the CoMP set; and
an obtaining module configured to obtain the reference signal pilot position of the another cell in the CoMP set;
wherein the obtaining module comprises:
a negotiating unit, configured to negotiate with an evolved NodeB (eNB) to which another cell in the CoMP set belongs about the reference signal pilot position wherein the reference signal pilot positions of the cells after the negotiation are orthogonally separated in a time-frequency domain multiplexing mode; and
a notifying unit, configured to send information comprising a reference signal pilot position of a particular cell to the eNB to which the another cell in the CoMP set belongs; and wherein the specified pilot position is the reference signal pilot position of the particular cell after the negotiation performed by the negotiating unit.

8. The apparatus for processing a reference signal according to claim 7, wherein the apparatus further comprises:
a notifying module, configured to notify the target UE of the specified pilot position.

9. The apparatus for processing a reference signal according to claim 8, wherein the notifying module comprises at least one of the following units:
a first sending unit, configured to send information comprising a cell identity (ID) to the target UE, wherein the cell ID is bound to the specified pilot position;
a second sending unit, configured to send information comprising a cell ID and a virtual ID that is related to a common feature of the CoMP set to the target UE, wherein the cell ID and the virtual ID are bound to the specified pilot position; and
a third sending unit, configured to send high-layer signaling comprising the specified pilot position to the target UE.

10. An apparatus for processing a reference signal, comprising:
a receiving module, configured to receive a reference signal in a specified pilot position, wherein data puncturing is respectively performed with respect to reference signals of another cell in a coordinated multipoint transmission/reception (CoMP) set that provides a service in positions corresponding to the specified pilot position, the specified pilot position is orthogonally separated from a reference signal pilot position of the another cell, and the another cell is a cell other than a cell corresponding to the specified pilot position;
a measuring module, configured to detect, and measure according to the reference signal received by the receiving module, a corresponding downlink channel, without detecting the data-punctured positions in data symbols of the another cell; and
an obtaining module, configured to obtain a reference signal pilot position of at least one cell, wherein the at least one cell belongs to the CoMP set that provides the service
wherein the obtaining module comprises:
a first obtaining unit, configured to obtain a cell identity (ID) of at least one cell; and
a second obtaining unit, configured to obtain at least one corresponding reference signal pilot position by performing a modulo operation with respect to the cell ID; and
wherein, the specified pilot position is any reference signal pilot position, in which a reference signal is received currently, among the at least one reference signal pilot position obtained by the second obtaining unit.

11. An apparatus for processing a reference signal, comprising:
a receiving module, configured to receive a reference signal in a specified pilot position, wherein data puncturing is respectively performed with respect to reference signals of another cell in a coordinated multipoint transmission/reception (CoMP) set that provides a service in positions corresponding to the specified pilot position, the specified pilot position is orthogonally separated from a reference signal pilot position of the another cell, and the another cell is a cell other than a cell corresponding to the specified pilot position;
a measuring module, configured to detect, and measure according to the reference signal received by the receiving module, a corresponding downlink channel, without detecting the data-punctured positions in data symbols of the another cell; and an obtaining module, configured to obtain a reference signal pilot position of at least one cell, wherein the at least one cell belongs to the CoMP set that provides the service wherein the obtaining module comprises:

a third obtaining unit, configured to obtain a cell ID of at least one cell and a virtual ID that is related to a common feature of the CoMP set; and a fourth obtaining unit, configured to obtain at least one corresponding reference signal pilot position by performing a calculation with respect to the at least one pair of virtual ID and cell ID; and wherein, the specified pilot position is: any reference signal pilot position, in which a reference signal is received currently, among the at least one reference signal pilot position obtained by the fourth obtaining unit.

12. An apparatus for processing a reference signal, comprising:

a receiving module, configured to receive a reference signal in a specified pilot position, wherein data puncturing is respectively performed with respect to reference signals of another cell in a coordinated multipoint transmission/reception (CoMP) set that provides a service in positions corresponding to the specified pilot position, the specified pilot position is orthogonally separated from a reference signal pilot position of the another cell, and the another cell is a cell other than a cell corresponding to the specified pilot position;

a measuring module, configured to detect, and measure according to the reference signal received by the receiving module, a corresponding downlink channel, without detecting the data-punctured positions in data symbols of the another cell; and an obtaining module, configured to obtain a reference signal pilot position of at least one cell, wherein the at least one cell belongs to the CoMP set that provides the service wherein the obtaining module comprises:

a first receiving unit, configured to receive at least one piece of high-layer signaling comprising a reference signal pilot position; and wherein, the specified pilot position is: any reference signal pilot position, in which a reference signal is received currently, among the at least one reference signal pilot position received by the first receiving unit.

13. A method for processing a reference signal, comprising:

receiving a reference signal in a specified pilot position, wherein data puncturing is respectively performed with respect to data symbols of another cell in a coordinated multipoint transmission/reception (CoMP) set that provides a service in positions corresponding to the specified pilot position;

detecting and, measuring according to the reference signal, a corresponding downlink channel, without detecting the data-punctured positions in the data symbols of the another cell; and obtaining a reference signal pilot position of at least one cell, wherein the at least one cell belongs to the CoMP set that provides the service;

wherein, the specified pilot position is orthogonally separated from a reference signal pilot position of the another cell;

wherein the another cell is a cell other than a cell corresponding to the specified pilot position;

wherein the obtaining the reference signal pilot position of at least one cell comprises:

obtaining a cell ID of at least one cell and a virtual ID that is related to a common feature of the CoMP set; and obtaining at least one corresponding reference signal pilot position by performing a calculation with respect to the at least one pair of virtual ID and cell ID; and wherein, the specified pilot position is: any reference signal pilot position, in which a reference signal is received currently, among the at least one reference signal pilot position.

14. A method for processing a reference signal, comprising:

receiving a reference signal in a specified pilot position, wherein data puncturing is respectively performed with respect to data symbols of another cell in a coordinated multipoint transmission/reception (CoMP) set that provides a service in positions corresponding to the specified pilot position;

detecting and, measuring according to the reference signal, a corresponding downlink channel, without detecting the data-punctured positions in the data symbols of the another cell; and obtaining a reference signal pilot position of at least one cell, wherein the at least one cell belongs to the CoMP set that provides the service;

wherein the specified pilot position is orthogonally separated from a reference signal pilot position of the another cell;

wherein the another cell is a cell other than a cell corresponding to the specified pilot position;

wherein the obtaining the reference signal pilot position of at least one cell comprises:

receiving at least one piece of high-layer signaling comprising a reference signal pilot position; and wherein the specified pilot position is any reference signal pilot position in which a reference signal is received currently among the at least one reference signal pilot position.

* * * * *